ated Feb. 15, 1972

United States Patent
Gundlach et al.

[15] 3,642,598
[45] Feb. 15, 1972

[54] PHOTOELECTROPHORETIC IMAGING METHOD AND APPARATUS

[72] Inventors: Robert W. Gundlach, Webster; Leon C. Lot, Victor; Christopher Snelling, Penfield, all of N.Y.

[73] Assignee: Xerox Corporation, Rochester, N.Y.

[22] Filed: Sept. 23, 1969

[21] Appl. No.: 860,347

[52] U.S. Cl. ...........................204/181, 96/1.3, 204/300, 355/3
[51] Int. Cl. ..............................................B01k 5/02
[58] Field of Search............355/3, 11, 12, 17; 96/1, 1.3, 96/1.5; 204/181, 300

[56] References Cited

UNITED STATES PATENTS

| 3,194,131 | 7/1965 | Robinson | 355/17 X |
| 3,335,003 | 8/1967 | Snelling | 355/17 X |
| 3,383,993 | 5/1968 | Yeh | 355/3 |
| 3,474,019 | 10/1969 | Krieger et al. | 96/1 X |
| 3,510,419 | 5/1970 | Carreira et al. | 96/1.5 X |

*Primary Examiner*—John M. Horan
*Assistant Examiner*—Fred L. Braun
*Attorney*—James J. Ralabate, David C. Petre and Richard A. Tomlin

[57] ABSTRACT

Electrically photosensitive particles dispersed in a carrier liquid are subjected to an electric field and exposed to imagewise light by reflection from an opaque document in a reflex exposure mode. A transparent material is positioned between the carrier liquid and the document.

7 Claims, 2 Drawing Figures

PATENTED FEB 15 1972

3,642,598

INVENTORS
ROBERT W. GUNDLACH
LEON C. LOT
BY CHRISTOPHER SNELLING

ATTORNEY

PHOTOELECTROPHORETIC IMAGING METHOD AND APPARATUS

BACKGROUND OF THE INVENTION

This invention relates in general to imaging systems. More specifically, the invention concerns a photoelectrophoretic imaging system utilizing reflex imaging.

There has been recently developed an electrophoretic imaging system capable of producing color images which utilizes electrically photosensitive particles. This process is described in detail and claimed in U.S. Pat. Nos. 3,384,566 to H. E. Clark, 3,384,565 to V. Tulagin et al., and 3,383,993 to Shu-Hsiung Yeh. In such an imaging system, variously colored light absorbing particles are suspended in a nonconducting liquid carrier. The suspension is placed between electrodes, one of which is generally conductive, called the "injecting" electrode and the other of which is generally insulating and called the "blocking" electrode.

One of these electrodes is at least partially transparent to activating electromagnetic radiation. The suspension is subjected to a potential difference between the electrodes across the suspension and exposed to an image through the transparent electrode. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation when brought into interaction range with an electrode. In a monochromatic system, a single colored image equivalent to conventional black-and-white photography is produced. In a polychromatic system, images are produced in natural color by using mixtures of particles of two or more different colors which are each sensitive to light of a specific wavelength or narrow range of wavelengths.

This system, using preferably a transparent conductive injecting electrode, a substantially insulating blocking electrode and photosensitive particles dispersed in an insulating carrier liquid, between the electrodes has been found to be capable of producing excellent images. One major disadvantage in the prior art systems as shown by the patents listed above is the bulky and expensive optical lens exposure systems utilized. Reflex imaging systems are known wherein light is directed through, for example, a thin uniformly charged xerographic plate and is reflected back by light areas of the document to be copied discharging the photoconductor in image configuration. The system just described requires that light pass through the photoconductor in both those areas where discharge is desired and areas where discharge is not desired unless the photoconductor is formed in a screen pattern and is suitably opaque when illuminated from the backside.

SUMMARY OF THE INVENTION

It is, therefore, an object of this invention to provide a photoelectrophoretic imaging system which overcomes the above-noted disadvantages.

It is another object of this invention to provide a photoelectrophoretic imaging system which does not require relatively expensive optical lens systems.

It is another object of this invention to provide a relatively compact imaging apparatus.

It is another object of this invention to provide a relatively compact, inexpensive imaging system capable of producing full color images.

It is another object of this invention to provide a photoelectrophoretic reflex imaging system which is relatively more efficient.

The above objects and others are accomplished in accordance with this invention by providing a photoelectrophoretic imaging system in which an imaging suspension of electrically photosensitive pigments dispersed in an insulating liquid are placed in an electroded system. One electrode has the document to be copied placed on its surface. The second electrode is a transparent conductive electrode through which uniform illumination is made. The light is absorbed by dark areas of the document and reflected by light areas. The increased exposure of the photosensitive particles in light areas causes particle migration in image configuration. Where preservation of the original document is desired the document may be overcoated or a separate sheet of transparent material placed on its surface.

In a preferred embodiment the transparent conductive electrode is instead made up of a plurality of transparent raised areas on an opaque conductive background. Since the raised portions will come in virtual contact with the document or document cover the photosensitive particles are exposed only to reflexed light providing a cleaner separation of particles resulting in higher contrast images and cleaner background. Further, because the illumination does not pass through the imaging suspension initially a more efficient use of the light occurs which reduces lamp and power requirements.

Where a transparent conductive electrode is used the electrode may comprise any suitable material. Typical materials include conductively coated glass such as tin oxide coated glass or transparent metallic coatings on transparent plastics. NESA glass, a tin oxide coated glass available from Pittsburgh Plate Glass Co. is preferred because of its optical clarity.

Where a screen pattern of opaque and transparent areas is desired any of the above materials may be used with the addition of a pattern of opaque material.

The opaque material may be for example, a metallic substance vacuum deposited through a screen on the above-mentioned substrates or on nonconducting transparent materials.

Where a plurality of raised areas is desired the plate may be prepared by any suitable method. For example, an opaque layer of metal may be formed by vacuum depositing onto a glass or plastic substrate having raised discrete areas or ridges and the opaque layer removed by mechanical abrasion. The plate may also be prepared by chemically machining UV-sensitive glass.

It is preferred to use a second electrode having a relatively insulating surface. The relatively insulating surface may be the document to be copied if its surface is glossy and impervious, or a protective transparent material placed over the document. Typical transparent insulating materials include cellulose acetate, polyethylene, nitro cellulose, polystyrene polytetrafluoroethylene, polyvinylfluoride, polyethylene terephthalate and mixtures thereof. DuPont Tedlar polyvinyl-flouride film is preferred because it combines high dielectric constant with high dielectric strength and is easy to clean in cases where the film is reused.

The use of a relatively insulating transparent film is preferred for several reasons. It protects the original document from the ink. It provides space between the ink and the document so that light incident only in areas adjacent to the transparent raised areas of the first electrode can be distributed over the ink surrounding each raised transparent area. Also the side facing the document may be coated with a transparent conducting film such as copper iodide so that changes in the conductivity of the document due to variations in relative humidity will not affect the applied fields.

The imaging suspension may comprise any suitable electrically photosensitive particles dispersed in a carrier liquid and may be of two or more colors. Typical electrically photosensitive particles and carrier liquids are disclosed in U.S. Pat. No. 3,384,488 issued May 21, 1968 to V. Tulagin et al. and U.S. Pat. No. 3,357,989 issued Dec. 12, 1967 to J. F. Byrne et al., the disclosures of which are incorporated herein by reference. The "$x$"-form of phthalocyanine is preferred for monochrome imaging because of its high sensitivity.

The imaging suspension may be coated on the injecting electrode or the blocking electrode. Typical coating methods include roller application, dip coating, spraying, or brushing.

BRIEF DESCRIPTION OF THE DRAWINGS

The advantages of this improved method of photoelectrophoretic imaging will become apparent upon consideration of the detailed disclosure of the invention especially when taken in conjunction with the accompanying drawings wherein:

Referring now to FIG. 1 there is seen a transparent electrode generally designated 1 which in this exemplary instance is made up of a layer of optically transparent glass 3 overcoated with a thin optically transparent layer of tin oxide 5, commercially available under the name NESA glass. This electrode is referred to as the "injecting electrode."

Figure 1:
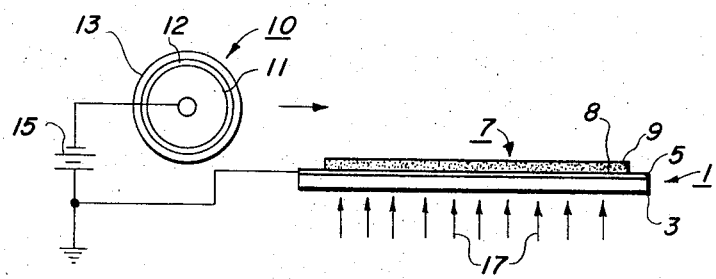
FIG. 1 is a side sectional view of a simple exemplary photoelectrophoretic imaging system wherein a transparent conductive electrode without opaque coating is used.

Coated on the surface of electrode 1 is a thin layer of an imaging suspension generally designated 7 which comprises electrically photosensitive particles 8 dispersed in an insulating carrier liquid 9.

A second electrode generally designated 10 in this exemplary instance comprises conductive aluminum roller 11 with the document to be copied 12 placed on its surface and transparent Tedlar sheet 13 placed over document 12. The conductive center of roller 10 and electrode 1 are connected to a source of DC potential 15 and ground.

In operation collimated light 17 is used to uniformly illuminate the imaging suspension 7. With power source 15 activated, roller 10 is caused to roll across imaging suspension 7. If a black and white or monochrome image is desired the illumination is selected so that it will be substantially absorbed by image areas of the document and substantially reflected by background areas. It is also possible to preferentially reflect off of image areas and have light absorbed in background areas, for example for white images on a black background. The particles are illuminated by reflection in imagewise configuration providing sufficient light to cause particles to exchange charge with the relatively insulating electrode and be repelled from it, providing on completion of roller traverse a positive image on the surface of roller 13 and a negative image on the surface of electrode 1. Either image may be used, for example, by being transferred to another substrate or be fixed in place.

For full color imaging particles 8 are selected to respond to a limited range of wavelengths. For example, for substractive full color image reproduction cyan particles responsive mainly to red light, magenta particles responsive mainly to green light and yellow particles responsive mainly to blue light are dispersed in liquid 9. When white light strikes, for example, a red area on document 12 the particles are illuminated by red light reflection, causing cyan particles to migrate away from roller 13, leaving behind the magenta and yellow particles which combined appear red. Where white light is reflected all particles are removed and where no light is reflected all particles remain providing white and black respectively on the surface of roller 13. This image may be removed, for example, by adhesive transfer, electrostatically, or other suitable means. Further, electrode 1 could be made up of a transparent conductive plastic such as cellophane or a thin layer of a plastic could be placed over electrode 1 providing a substrate to which the image could be readily permanently affixed, by for example, heating or by laminating a sheet over the image.

A serious limitation arises because the ink layer may be fairly opaque to the radiation and so the uniform illumination 17 causes a greater photoelectric response of the imaging particles than does the reflected light from the document 12, and thus the image is considerably obscured by the overwhelming photoresponse to the initial illumination 17.

Figure 2:
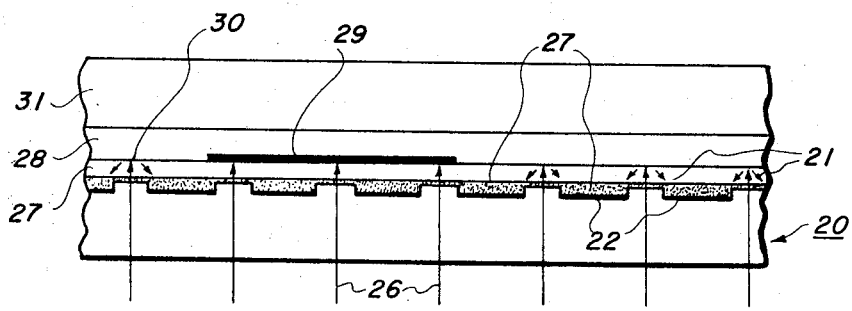
FIG. 2 is a side sectional view of a simple exemplary photoelectrophoretic imaging system wherein the conductive injecting electrode has a series of raised transparent areas.

In order to dramatically improve quality while retaining the basic simplicity of the process and operation, the embodiment of FIG. 2 is utilized.

Referring now to FIG. 2 there is seen an enlarged cross section of a simple exemplary partially transparent imaging plate generally designated 20 which has raised transparent areas 21 surrounded by an opaque conductive background 22. Plate 20 may be, for example, glass formed with a raised pattern of dots or ridges here shown greatly exaggerated in size for purposes of explanation. The plate is then overcoated with sufficient metal to be opaque to the illumination used. The metal is then conveniently removed from the raised dots by abrasion.

Sandwiching the structure together under slight pressure excludes most or all of the ink from the raised dots or ridges, and thereby increases the efficiency of light transmission to the document 28.

Preferably raised areas 21 are from 10 to 20 microns high and make up from about 5 to about 10 percent of the total surface area of electrode 20. High quality images are produced when the raised areas number from about 150 to 200 per linear inch of surface area.

Light 26 is projected through plate 20, document cover sheet 27 to document 28 bearing image area 29 and background areas 30. The light is reflected by background as shown, causing particle migration. The method of operation is as discussed in connection with FIG. 1, but in this case essentially only light reflected from the image is present in the inked areas. Electrode 31 and the opaque conductive areas 22 are connected to a source of DC potential. Electrodes 31 and 20 may be continuous flexible webs entrained over rollers, rollers, flat plates or of other suitable configuration.

A positive image may be formed on the surface of sheet 27 or on electrode 20. If it is desired to form a positive image on the surface of sheet 27 the pigment particles are initially attracted to the surface of sheet 27. This may be done by initially coating the suspension on sheet 27 and by corona charging or by properly selecting the charge of the particles and the sign of the charge on the document side electrode pull the particles to the sheet. Exposure 26 will then cause the particles to move away from the surface of sheet 27 to electrode 20 in light struck areas leaving a positive image on the surface of sheet 27. Here electrode 20 may also be insulating in nature since no charge exchange is required or desired at electrode 20.

DESCRIPTION OF THE PREFERRED EMBODIMENTS

The following examples further specifically illustrate the improved photoelectrophoretic imaging system of this invention. Parts and percentages are by weight unless otherwise indicated. The examples below are intended to illustrate various preferred embodiments of the present invention. All of the following examples are carried out in apparatus of the general type illustrated in the drawings.

The conductive surface of the injecting electrode is connected to ground and in series with a potential source, a switch, and the conductive center of a roller having an original to be copied covered with a Tedlar sheet on its surface. The roller is approximately 6 inches in diameter and is moved across the plate surface at about 6 inches per second. The plate injecting electrode employed is roughly 12 inches square and is exposed with a light intensity of 80 foot-candles as measured on the uncoated injecting electrode surface. Unless otherwise indicated, a total of about 7 percent by weight of the indicated pigments in each example are suspended in Sohio Odorless Solvent 3440, a kerosene fraction available from Standard Oil of Ohio, and the magnitude of the applied potential is 2,500 volts, the roller being negative relative to the injecting electrode. Exposure is made with a 3,200° k. lamp.

EXAMPLE I

In this example a 12-inch-square NESA glass plate is used as the injecting electrode as shown in FIG. 1. An imaging suspension is prepared by suspending about seven parts of finely divided particles of a cyan pigment, Monolight Fast Blue GS, the alpha form of metal-free phthalocyanine, C.I. No. 74100, available from Arnold Hoffman Co. in about 100 parts Sohio Odorless Solvent 3440. The suspension is coated by brushing onto the NESA plate. A typewritten document is taped to the roller and a Tedlar sheet taped over the document. The roller electrode is then rolled across the suspension with uniform illumination and field applied. On completion of the roller traverse a positive cyan image is found adhering to the NESA plate and a negative image is found adhering to the Tedlar.

EXAMPLE II

The experiment of Example I is repeated except that the typewritten document is replaced with a full color print and the imaging suspension is replaced by an imaging suspension containing about 0.75 grams of a magenta pigment, Watchung Red B, a barium salt of 1-(4'-methyl-5'-chloroazobenzene-2'-sulfonic acid)-2-hydroxy-3-naphthoic acid, C.I. No. 15865; about 1.2 grams of a yellow pigment, N-2'''-pyridyl-8,13-dioxodinaphtho-(2, 1–b;2', 3'–d)-furan-6-carboxamide, and about 1.8 grams of a cyan pigment, Monolite Fast Blue G.S., the alpha form of metal-free phthalocyanine, C.I. No. 74100 in 50 milliliters of Sohio Odorless Solvent 3440.

A positive image is found adhering to the NESA glass after the roller traverse is completed. A complimentary image is found adhering to the Tedlar.

EXAMPLE III

The experiment of Example I is repeated except that the NESA glass plate is replaced by a transparent plate having a raised pattern of dots approximately 15 microns high and covering about 5 percent of the total surface area of the plate. The remaining about 95 percent of the surface is coated with an opaque thin conductive layer of the metal as shown in FIG. 2. There are approximately 150 raised areas per linear inch of surface. The resulting images are of very good quality.

EXAMPLE IV

The experiment of Example II is repeated using the injecting electrode of Example III. A very good quality full color image is formed on the surface of the injecting electrode.

EXAMPLE V

The experiment of Example I is repeated except that an injecting electrode is used which has a pattern of raised ridges approximately 15 microns high running across it in a direction paralleling the direction of motion of the roller. The ridges take up about 10 percent of the total surface area and number about 200 to the inch. The remaining 90 percent of the surface area has an opaque conductive layer of a metal on it. The resulting images are of very good quality.

EXAMPLE VI

The experiment of Example II is repeated using the injecting electrode of Example V. A very good quality full color image is formed on the surface of the injecting electrode.

Although specific components and proportions have been described in the above examples, other suitable materials, as listed above, may be used with similar results. In addition, other materials may be added to the imaging suspension or electrically photosensitive particles to synergize, enhance or otherwise modify their properties.

Other modifications and ramifications of the present invention will occur to those skilled in the art upon a reading of the present disclosure. These are intended to be included within the scope of this invention.

What is claimed is:
1. The method of reflex photoelectrophoretic imaging which comprises the steps of:
   a. providing a layer of an imaging suspension of electrically photosensitive particles in an insulating carrier liquid between a first transparent conductive electrode and a second electrode, said second electrode having on its surface an image bearing member and over said image bearing member a layer of a transparent material;
   b. applying an electrical field across said imaging suspension;
   c. illuminating said image bearing member by projecting electromagnetic radiation through said first electrode until an image is formed.

2. The method of claim 1 wherein said first electrode has raised nonconductive areas and opaque conductive areas.

3. The method of claim 1 wherein said particles comprise particles of more than one color, the particles of one color having a photosensitive response which does not substantially overlap the photosensitive response of particles of a different color; and, illuminating said imaging suspension with electromagnetic radiation containing wavelengths of radiation to which particles of more than one color respond.

4. The method of claim 3 wherein said particles comprise yellow particles responsive mainly to blue light, magenta particles responsive mainly to green light and cyan particles responsive mainly to red light.

5. An apparatus for photoelectrophoretic contact reflex imaging comprising:
   a. a first transparent electrode having a first surface for supporting an imaging suspension;
   b. means for bringing an image bearing member having a transparent layer thereon into contact with a suspension supported on said first electrode;
   c. means for applying an electrical potential across an imaging suspension supported on said first electrode; and,
   d. means for projecting electromagnetic radiation through said first electrode to illuminate said image bearing member.

6. The apparatus of claim 5 wherein said first surface of said first electrode has raised transparent nonconductive areas and conductive opaque areas.

7. The apparatus of claim 5 and further including an electrode for supporting said image bearing member.

* * * * *